(12) United States Patent
Hassan-Ali et al.

(10) Patent No.: US 7,236,495 B2
(45) Date of Patent: Jun. 26, 2007

(54) CALENDAR HEAP SYSTEM AND METHOD FOR EFFICIENT SORTING

(75) Inventors: Mudhafar Hassan-Ali, Rohner Park, CA (US); Jeff Mendelson, Petaluma, CA (US); Annie Rastello, Rohnert Park, CA (US); Li-Sheng Chen, Petaluma, CA (US); Radimir Shilshtut, Rohnert Park, CA (US); Sina Soltani, Rohnert, CA (US); Francisco Moreno, Petaluma, CA (US)

(73) Assignee: Alcatel Lucent, Paris (FR)

( * ) Notice: Subject to any disclaimer, the term of this patent is extended or adjusted under 35 U.S.C. 154(b) by 1040 days.

(21) Appl. No.: 10/281,033

(22) Filed: Oct. 25, 2002

(65) Prior Publication Data

US 2004/0081157 A1    Apr. 29, 2004

(51) Int. Cl.
*G06F 7/24* (2006.01)
(52) U.S. Cl. .................................. 370/395.1
(58) Field of Classification Search ............. 370/395.1, 370/395.4, 395.7, 412, 428
See application file for complete search history.

(56) References Cited

U.S. PATENT DOCUMENTS

| 4,878,048 A | 10/1989 | Gottesman et al. |
| 5,119,370 A | 6/1992 | Terry |
| 5,237,565 A | 8/1993 | Henrion et al. |
| 5,287,355 A | 2/1994 | Takahashi et al. |
| 5,383,180 A | 1/1995 | Kartalopoulos |
| 5,396,622 A | 3/1995 | Lee et al. |
| 5,526,344 A | 6/1996 | Langdon et al. |
| 5,734,656 A | 3/1998 | Prince et al. |
| 5,784,371 A | 7/1998 | Iwai |
| 5,850,399 A | 12/1998 | Ganmukhi et al. |
| 5,859,835 A | 1/1999 | Varma et al. |
| 5,862,136 A | 1/1999 | Irwin |
| 5,875,190 A | 2/1999 | Law |
| 5,878,042 A | 3/1999 | Fraas et al. |

(Continued)

FOREIGN PATENT DOCUMENTS

EP    0 901 302 A2    3/1999

(Continued)

OTHER PUBLICATIONS

Giroux, Natalie and Ganti, Sudhakar, "Queuing and Scheduling", Quality of Service in ATM Networks: State of the Art Traffic Management, Chapter 5, pates 85-121.

(Continued)

*Primary Examiner*—Derrick W. Ferris
(74) *Attorney, Agent, or Firm*—Bobby D. Slaton

(57) ABSTRACT

A calendar heap structure and method for sorting N timestamp (TS) values in an ATM fabric scheduler implemented in an access network element. The heap structure is implemented using a radix value (R) for grouping the N TS values into a number of groups. Validity bits associated with the TS values are hierarchically arranged in a tree having $\log_R(N)$ levels, wherein the bottom layer's N bits correspond to pointers that point to linked lists of flows with respective TS values. Starting from the top level heap, each subsequent level's heaps are successively examined for determining which particular heap obtains a minimum value until a particular validity bit of the bottom level is reached, which validity bit points to the minimum TS.

17 Claims, 7 Drawing Sheets

U.S. PATENT DOCUMENTS

| | | |
|---|---|---|
| 5,889,773 A | 3/1999 | Stevenson, III |
| 5,896,382 A | 4/1999 | Davis et al. |
| 5,901,024 A | 5/1999 | Deschaine et al. |
| 5,926,479 A | 7/1999 | Baran |
| 5,953,338 A | 9/1999 | Ma |
| 6,064,650 A | 5/2000 | Kappler et al. |
| 6,064,651 A | 5/2000 | Rogers et al. |
| 6,081,507 A | 6/2000 | Chao et al. |
| 6,128,295 A | 10/2000 | Larsson et al. |
| 6,353,593 B1 | 3/2002 | Chen |
| 6,370,159 B1 | 4/2002 | Eidson |
| 6,389,031 B1 * | 5/2002 | Chao et al. ............... 370/412 |
| 6,396,843 B1 * | 5/2002 | Chiussi et al. ............ 370/418 |
| 6,411,957 B1 | 6/2002 | Dijkstra |
| 6,415,325 B1 | 7/2002 | Morrien |
| 6,434,140 B1 | 8/2002 | Barany et al. |
| 6,480,487 B1 | 11/2002 | Wegleitner et al. |
| 6,480,511 B1 | 11/2002 | Petty |
| 6,574,217 B1 | 6/2003 | Lewis et al. |
| 6,728,239 B1 | 4/2004 | Kung et al. |
| 6,904,060 B2 | 6/2005 | Nelson et al. |
| 6,914,898 B2 | 7/2005 | Sasagawa et al. |
| 6,950,441 B1 | 9/2005 | Kaczmarczyk et al. |

FOREIGN PATENT DOCUMENTS

| | | |
|---|---|---|
| EP | 0 961 512 A1 | 12/1999 |
| EP | 1 093 266 A2 | 4/2001 |
| EP | 1 111 855 A2 | 6/2001 |
| EP | 1 111 858 A2 | 6/2001 |
| EP | 0 522 773 A2 | 5/2004 |
| EP | 0 713 347 A2 | 5/2004 |
| WO | 97/04558 | 2/1997 |
| WO | 00/11880 A2 | 3/2000 |
| WO | 01/86884 A1 | 11/2001 |

OTHER PUBLICATIONS

Kaufman, Jill et al "ATM Forum Education Corner", at http://www.atmforum.com/pages/library/53bytes/backissues/others/53bytes-0994-4.html.

Traffic Management Specification, The ATM Forum Technical Committee, Version 4.1, AF-TM-0121.000, Mar. 1999.

Knuth, D.E., "The Art of Computer Programming, vol. 3: Sorting and Searching", 1973, Addison-Wesley Publishing Company, Inc. U.S.A. XP002271706.

Knuth, D.E.; "The Art of Computer Programming, vol. 3: Sorting and Searching"; 1973; Addison-Wesley Publishing Company, Inc.; USA.

\* cited by examiner

CALENDAR HEAP SYSTEM AND METHOD FOR EFFICIENT SORTING

CROSS-REFERENCE TO RELATED APPLICATION(S)

This application discloses subject matter related to the subject matter disclosed in the following commonly owned co-pending U.S. patent applications: (i) "Stackplane Architecture," filed Dec. 22, 1999, application Ser. No. 09/469,897, in the names of James W. Dove et al.; (ii) "Scalable Architecture For An Access Node," filed Jun. 27, 2002, application Ser. No. 10/184,386, in the name(s) of Eric Friedriebs et al.; (iii) "Integrated Gateway Functionality In An Access Network Element," filed Nov. 2, 2001, application Ser. No. 10/052,846, in the names of Thornton Collins et at; (iv) "Multicasting System And Method For Use In An Access Node's ATM Switch Fabric," filed even date herewith, application Ser. No. 10/280,959, in the names of Mudhafar Hassan-Ali et al.; (v) "Virtual Group Connection Scheme For ATM Architecture In An Access Node," filed even date herewith, application Ser. No. 10/280,604, in the names of Mudhafar Hassan-Ali et at; (vi) "System And Method For Implementing GFR Service In An Access Node's ATM Switch Fabric," filed even date herewith, application Ser. No. 10/280,700, in the names of Mudhafar Hassan-Ali et al.; (vii) "Hierarchical Scheduler Architecture For Use With An Access Node," filed even date herewith, application Ser. No. 10/280,894, in the names of Mudhafar Hassan-Ali et al., which are hereby incorporated by reference herein for all purposes.

BACKGROUND OF THE INVENTION

1. Technical Field of the Invention

The present invention generally relates to telecommunications. More particularly, and not by way of any limitation, the present invention is directed to a calendar heap system and method for efficiently sorting timestamps used in an Asynchronous Transfer Mode (ATM) scheduling environment.

2. Description of Related Art

The remote access market is undergoing a major metamorphosis. Three factors serve as catalysts for change. The first is the growing number of users, for example, small office/home office (SOHO) users, demanding high performance Internet and remote access for multimedia. Liberalized governmental activity with respect to telecommunications is another factor, which is fostering broader competition through deregulation in local area markets everywhere. The third and final factor is congestion in the Public Switched Telephone Network (PSTN), originally designed and developed for voice-only traffic.

There have been several important advances in telecommunications technology that enable high rates of throughput in carrier networks' backbone connections. For example, by implementing Asynchronous Transfer Mode (ATM) networking technology over a Synchronous Optical Network (SONET)/Synchronous Digital Hierarchy (SDH) physical layer, carrier networks can achieve data rates of up to several hundred megabits per second (Mbps). However, efforts to meet the bandwidth demand for remote access have been beset by the limitations of the existing twisted-pair copper cable infrastructure (i.e., access network) provided between a carrier's central office (CO) and a subscriber's remote site, typically referred to as the local loop. In the telecommunications art, these limitations are sometimes collectively described as the "last-mile" problem.

Current access network solutions that attempt to avoid the bottleneck created by the last-mile problem involve the use of fiber optic technology in the local loop also. As with the high-speed carrier networks, the fiber-based local loop infrastructure is typically architected using SONET as the physical layer technology. With recent developments in optical components and related opto-electronics, in addition to improvements in network design, broadband access is now becoming commonplace.

Moreover, coupled with the phenomenal growth in popularity of the Internet, there has been a tremendous interest in using packet-switched network (PSN) infrastructures (e.g., those based on Internet Protocol (IP) addressing) as a replacement for the existing circuit-switched network (CSN) infrastructures used in today's telecommunications networks. From the network operators' perspective, the inherent traffic aggregation in packet-switched infrastructures allows for a reduction in the cost of transmission and the infrastructure cost per end-user. Ultimately, such cost reductions enable the network operators to pass on the concomitant cost savings to the end-users.

Accordingly, a new breed of service-centric networks (distinct from the existing voice-centric and data-centric networks) are being explored for implementation on what is known as the next-generation network (NGN) infrastructure, where integrated voice/data/video applications may be provisioned using a packet transport mechanism over a PSN in an end-to-end transmission path. As alluded to hereinabove, it is believed that using a packet network infrastructure in access networks provides higher transmission efficiency, lower operation and maintenance costs, and a unified access.

Traditional access systems allow accessing a digital local voice switch, such as a Class 5 switch, by extending a plurality of metallic loops and aggregating them in a bundle for efficiently transmitting the time-division multiplexed (TDM) voice traffic. Typically, such access networks are architected using one or more access nodes in a variety of configurations, e.g., point-to-point chains, rings, etc., wherein an access node may itself comprise several channel banks that provide line interfaces servicing a large number of subscribers.

In order to afford increased levels of functionality and service provisioning, however, access networks of today are being required to support advanced transport mechanisms such as SONET for the internal architecture of the nodes as well. In such nodes, ATM is used for carrying most of the subscriber traffic, except the traditional TDM services such as T1 and TDM-DS3 services. Accordingly, both TDM as well as ATM switching fabrics need to be supported in the access node design.

The ATM Forum provides a set of specifications governing the various aspects of an ATM switching fabric, including the fabric's scheduler whose function is to regulate the injection of incoming cells into the fabric. More particularly, the ATMF-TM-121 Standard provides the general description of scheduler requirements, including traffic policing/shaping functionality that is necessary to support different Classes of Service (CoS) such as Constant Bit Rate (CBR), Variable Bit Rate (VBR), Guaranteed Frame Rate (GFR), and the like. This Standard does not set forth, however, the implementational aspects in specific detail, especially in the context of an access node's internal architecture operable with SONET transport.

In general, ATM scheduler implementations involve the use of timestamp (TS) data in conjunction with traffic flows in an ATM switch where the incoming packets or cells are given TS tags in some predetermined manner. Often, it is necessary to perform various operations with respect to the TS data stored in a suitable data structure as part of the scheduler implementation. Such operations may comprise insertion, deletion, sorting, searching, sequencing, and the like. Where a large number of TS tags are required, it becomes imperative that the data structure methodology used for effectuating these operations be efficient as well as fast enough. This concern is particularly significant in applications having a sizeable bit field for TS values. For instance, if a 22-bit TS is used, approximately $2^{22}$=4 million TS data values are possible. Additionally, in an architecture where traffic flows are scheduled based on a hierarchical scheduler arrangement, e.g., involving multiple data aggregation layers and several CoS levels, the total number of TS values becomes astronomical.

Heaps and calendar queues are some of the known data structures used for sorting large datasets. Although such data structures are generally adequate, they tend to be less efficient in terms of memory (e.g., queues) or slow due to algorithmic complexity (e.g., heaps). As a result, straightforward implementation of the existing solutions in a high-speed ATM switch fabric design (>1 Gbps, for example) yields sub-optimal performance.

SUMMARY OF THE INVENTION

Accordingly, the present invention provides a hybrid "calendar heap" (CH) structure and method for sorting N TS values in an ATM fabric scheduler implemented in an access network element, which advantageously overcomes the aforesaid drawbacks and deficiencies. The CH structure is implemented using a radix value (R) for grouping the N TS values into a number of groups. Validity bits associated with the TS values are hierarchically arranged in a tree having $\log_R(N)$ levels, wherein the bottom layer's N bits correspond to pointers that point to linked lists of flows with respective TS values. Starting from the top level heap, each subsequent level's heaps are successively examined for determining which particular heap obtains a minimum value until a particular validity bit of the bottom level is reached, which validity bit points to the minimum TS.

BRIEF DESCRIPTION OF THE DRAWINGS

A more complete understanding of the present invention may be had by reference to the following Detailed Description when taken in conjunction with the accompanying drawings wherein.

DETAILED DESCRIPTION OF THE DRAWINGS

An embodiment of the present invention will now be set forth in light of the teachings provided in the commonly owned co-pending U.S. patent application entitled "Hierarchical Scheduler Architecture For Use With An Access Node," filed even date herewith, application Ser. No. 10/280,894, in the names of Mudhafar Hassan-Ali et al., (hereinafter, the Hierarchical Scheduler Architecture application), incorporated by reference hereinabove. As described in detail in that application, a telecommunications node disposed in an access network may be comprised of a scalable architecture wherein both TDM and ATM switching fabrics are provided in order to support increased levels of functionality. Additionally, the scheduling functionality associated with the ATM switching fabric can be partitioned on a per-service category basis and across a plurality of hierarchical data pipe aggregations (i.e., subport, bus level, shelf level, stackplane level, and pipe level, et cetera, treated as aggregation layers) as may be necessitated by the scalable hardware architecture so that traffic contract compliance as well as requisite connection isolation and fair bandwidth allocation can be effectively achieved in the ATM switching fabric of an access network node.

Figure 1:
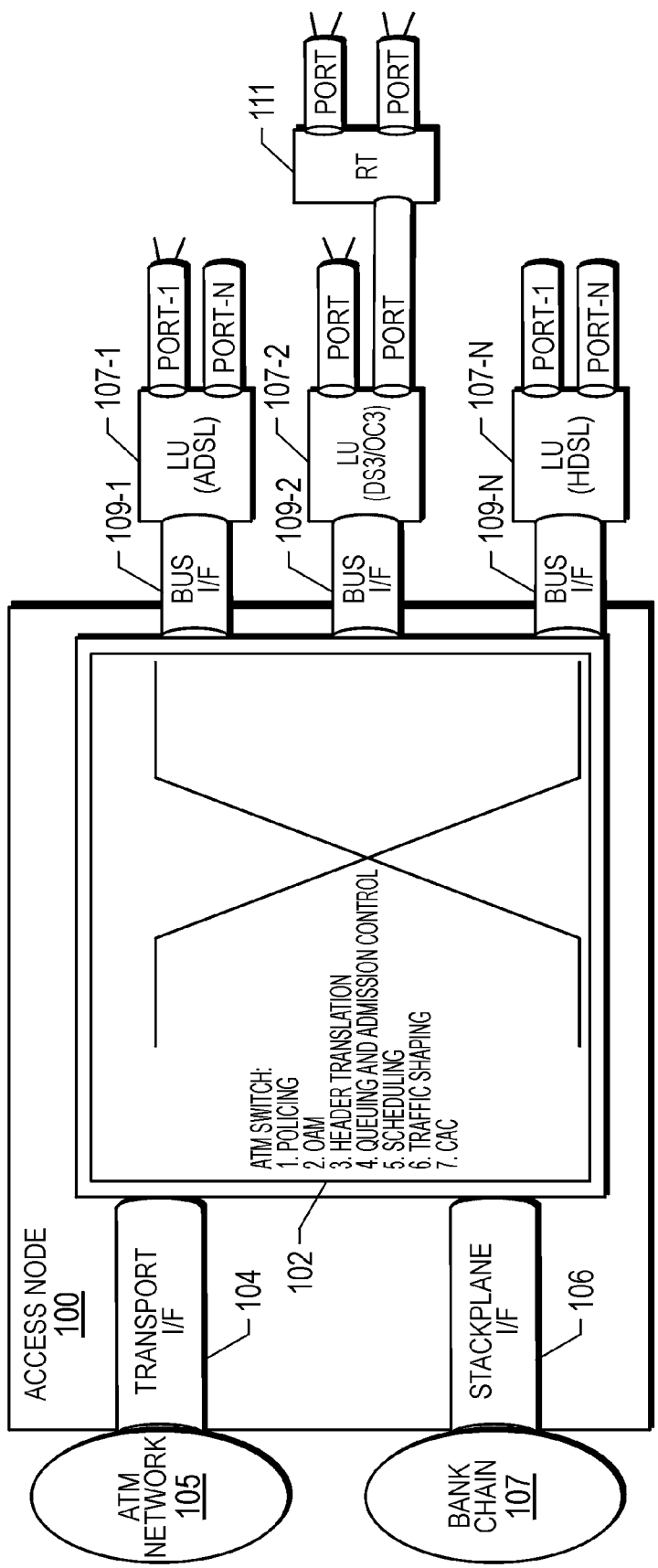
FIG. 1 depicts an exemplary access node having an ATM switching fabric wherein the teachings of the present invention may be advantageously practiced.

Referring now to the drawings of the present patent application, wherein like or similar elements are designated with identical reference numerals throughout the several views thereof and the various elements depicted are not necessarily drawn to scale, and referring in particular to FIG. 1, depicted therein is an exemplary access node 100 having a high level functional representation of an ATM switch fabric 102, wherein the teachings of the present invention may be advantageously practiced. As explained in the Hierarchical Scheduler Architecture application referenced above, the overall functionality of the switch fabric 102 includes: policing; operation, administration and maintenance (OAM); header translation; queuing; scheduling and traffic shaping; and Connection Admission Control (CAC). As can be readily seen, traffic to the fabric 102 is provided via a number of interfaces. A transport interface 104 is operable to connect the node's fabric to a backbone network, e.g., ATM network 105. A stackplane interface 106 is operable to carry the traffic from a secondary shelf bank chain 107 (e.g., comprising channel banks 506-1 through 506-4 and channel banks 508-1 through 508-4 shown in FIG. 5 of the Hierarchical Scheduler Architecture application) to the fabric 102. A plurality of subscriber interfaces via line units (LUs) 107-1 through 107-N exemplify various service sources such as xDSL, T1, ISDN, DS-3/OC-3, etc., that can interface with the fabric 102 through appropriate bus level ports 109-1 through 109-N. One of the ports of a line unit may be coupled to an RT 111 as part of an access network (not shown in this FIG.).

Two types of ATM connections may be defined with respect to the internal ATM traffic: Virtual Channel Connections (VCCs) and Virtual Path Connections (VPCs). A VCC is typically the lowest flow granularity an ATM connection may have, which is identified by a unique value comprising a pair of identifiers, i.e., Virtual Channel Identifier (VCI) and Virtual Path Identifier (VPI), on a physical interface. A VPC, on the other hand, is defined as a group of all flows that share the same VPI value and a common pool of resources (e.g., bandwidth, et cetera). Thus, it can be seen that a VP is a bundling of VCs which can simplify the management of the connections in an ATM environment by reducing the number of elements to manage, wherein each connection is identified by its unique VPI/VCI pair.

From the standpoint of topology, a VCC or a VPC can be either of the following two types: (i) point-to-point connections, wherein bi-directional connections are established and the sources in each direction may be different and (ii) point-to-multipoint connections, which typically utilize a plurality of uni-directional connections for multicast transport across the fabric.

In addition, another level of ATM connection hierarchy, called a Virtual Group Connection or VGC, may also be implemented, wherein the TS values associated with the constituent flows thereof may be sorted within the context of the present invention. Additional details regarding the VGC implementation are provided in the following the commonly owned co-pending U.S. patent application entitled "Virtual Group Connection Scheme For ATM Architecture In An Access Node," filed even date herewith, application Ser. No. 10/280,604, in the names of Mudhafar Hassan-Ali et al., incorporated by reference hereinabove.

Ingress traffic management with respect to the flows presented to the switch fabric 102 (whose functionality may be embodied as an ATM cross-connect fabric (XCF) card) accordingly encompasses three stages in general: policing, VC queue/buffer allocation and shaping/scheduling. In one implementation, hardware relating to these stages may be integrated within the XCF card. The primary function of a policer is to ensure that the received cells are compliant with respect to applicable connection descriptors. If not, the incoming cells may be dropped or marked (i.e., tagged) by clearing/setting a Cell Loss Priority (CLP) field in their header portion. In general, the policing functionality is implemented by utilizing well known algorithms described in ITU-T 1.371 and ATM Forum ATMF-TM-121 standards. Essentially, these algorithms (typically categorized as a Generic Cell Rate Algorithm or GCRA) use what is known as a credit counter called bucket and the credit known as tokens. If there is enough credit (i.e., tokens) in the counter (i.e., bucket) upon receiving a cell, then the cell is admitted; otherwise, the cell is tagged as a lower priority cell or discarded. Furthermore, as explained in the Hierarchical Scheduler Architecture application, the GCRA-based algorithms can be implemented in what is known as a Leaky Bucket Module (LBM) for both traffic policing and traffic shaping (i.e., scheduling) purposes with respect to several ATM traffic Classes (categorized based on a Class of Service that is defined by such factors as the time sensitivity, peak and sustained bandwidth guarantees, burstiness and delivery guarantees).

The hierarchical scheduling functionality is implemented by means of a Priority Queue Module (PQM) (not shown in this FIG.), wherein each layer performs the scheduling function for an entry, which can be one of the following based on the flow aggregation: subport, bus, port, and pipe. Essentially, when a cell of new flow is received by the fabric, this data flow is represented by one entry in the scheduler as follows. A Flow ID (i.e., FID) is received from the LBM and, based on the CoS/QoS, the data of the flow, that is, FID and TS issued by the scheduler, are stored in the applicable layer-1 data structure. Thus, the TS dataset is essentially an exhaustive list of all the TS values the scheduler can issue at each partition layer and service plane combination for all the flows thereat. Each value is associated with a pointer that points to a linked list that contains all eligible flows beginning at that particular TS value. From all competing subports in layer-1 (e.g., different flows from a line unit), only one with the minimum TS is selected by the layer arbiter, which is then forwarded to the next layer's arbitration, i.e., layer-2 arbitration. The layer-2 data structure accordingly contains "winner FID/TS" data from different subports. Again, only one entry having the minimum TS is selected to be forwarded to layer-3. The scenario is thus successively repeated for additional aggregation layers, which ultimately results in a winner nominee (i.e., the FID/TS data of the winning cell) for each service priority category. As further pointed out in the Hierarchical Scheduler Architecture application, the layer-based arbitration is performed for each service category plane so as to result in a winner nominee for each plane, whereupon a CoS-aware TS-based arbiter selects a final winner by arbitrating among nominees from each service plane.

Figure 2:
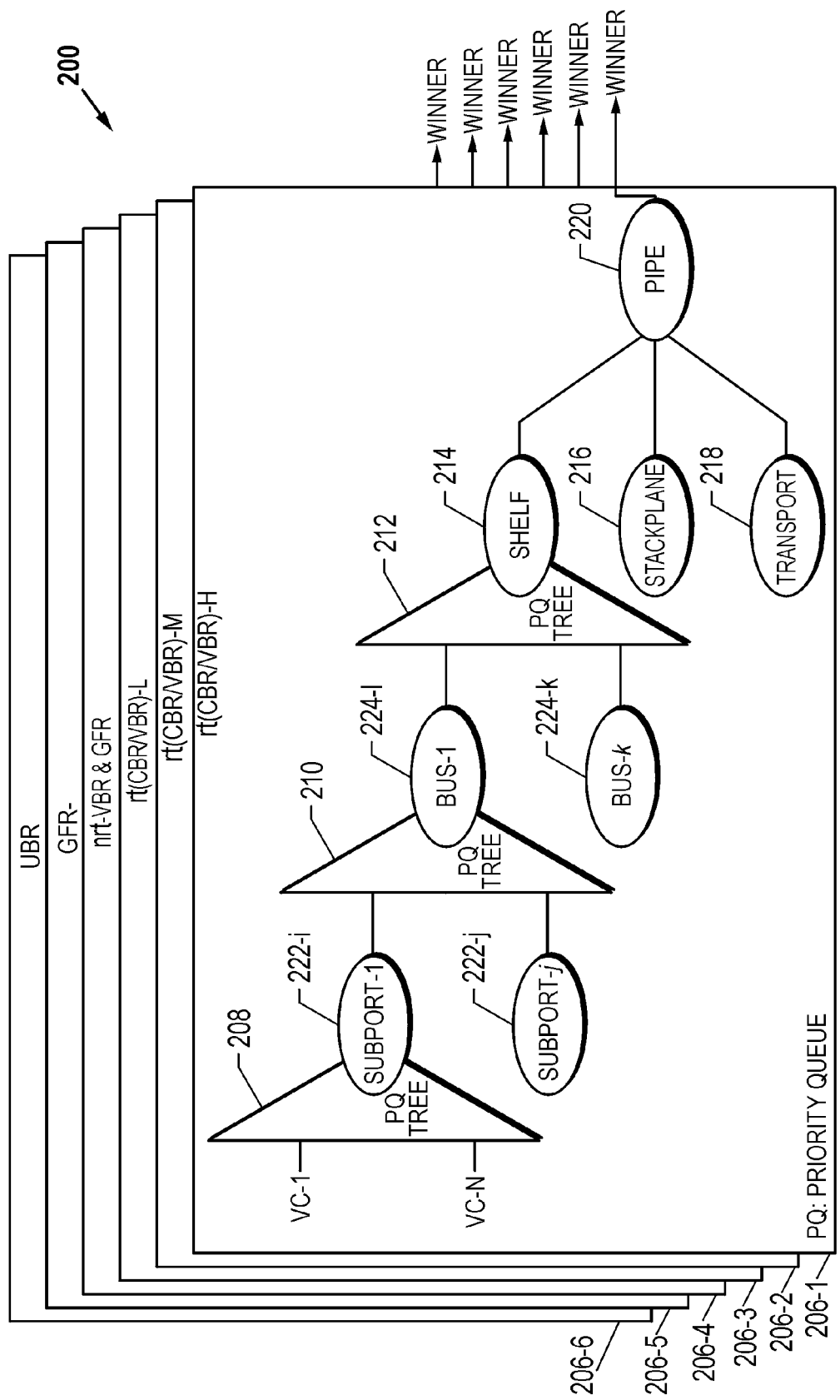
FIG. 2 depicts an embodiment of a multi-layer, multi-plane scheduler operable to utilize the sorting scheme of the present invention in the implementation of the ATM switching fabric shown in FIG. 1.

It should therefore be recognized that arbitration at each layer involves managing the PQ structures associated therewith for selecting a winner for that layer. In general, the PQ structures are implemented in a tree fashion, wherein the data nodes (representing, e.g., the TS/FID of the admitted cell or the cell selected from the lower layer) are arranged in accordance with certain insertion/deletion rules. As will be seen in additional detail hereinbelow, a particular data structure, called the calendar heap (CH) structure, is utilized for efficiently sorting the TS parameters in accordance with the teachings of the present invention. FIG. 2 depicts an embodiment of a multi-layer, multi-plane scheduler 200 operable to utilize the sorting scheme of the present invention in the implementation of the ATM switching fabric shown in FIG. 1. Each of the PQ entities of the scheduler 200 at each aggregation layer is shown as a tree structure, resulting in an overall nested tree arrangement for each service plane. The following table sets forth various exemplary services and associated parametric information:

TABLE I

| Class of Service | Applications | Parameters |
| --- | --- | --- |
| Real time Constant Bit Rate (CBR), real time Variable Bit Rate (rt-VBR) | Voice (single channel or trunk), VBR video, games | Peak Cell Rate (PCR), Cell Delay Variance Tolerance (CDVT) |
| Non-real time Variable Bit Rate (nrt-VBR) | Data, multimedia, email, video streaming | PCR, CDVT, Sustainable Cell Rate (SCR), Maximum Burst Size (MBS) |
| Guaranteed Frame Rate (GFR) | Premium Data, Web browsing, Internet | PCR, CDVT, MBS, Maximum Cell Rate (MCR), Maximum Frame Size (MFS) |
| Best effort (Unspecified Bit Rate or UBR) | Inexpensive data, Web browsing and Internet | PCR, CDVT |

Additional details relating to the parametric data and QoS levels can be found in the Hierarchical Scheduler Architecture application. Continuing with FIG. 2, reference numerals 206-1 through 206-6 refer to the following service planes: rt[CBR/VBR]—HIGH plane, rt[CBR/VBR]—MEDIUM plane, rt[CBR/VBR]—LOW plane, nrt-VBR and GFR plane, GFR- plane, and UBR (i.e., Best Effort) plane, respectively. Reference numeral 208 refers to the PQ tree corresponding to a subport arbiter 1305-i, wherein the PQ tree is formed based on the VC connections supported by the corresponding subport. Essentially, each subport of the scheduler uses (or builds) a PQ which is a data structure that stores all active FIDs (i.e., the VC queue associated with the FID has at least one cell in it). The winners from all the subport arbiters (e.g., subport arbiters 222-i and 222-j) are forwarded to populate the next-level PQ tree structure 210 associated with a bus level arbiter 224-1. Likewise, the bus level arbiters 224-1 and 224-k forward the respective selections to a shelf level PQ structure 212. A shelf level arbiter 214, a stackplane interface 216, a transport level interface 218 forward their selections to a pipe level arbiter 220 that selects a winner nominee for a particular service plane.

Figure 3:
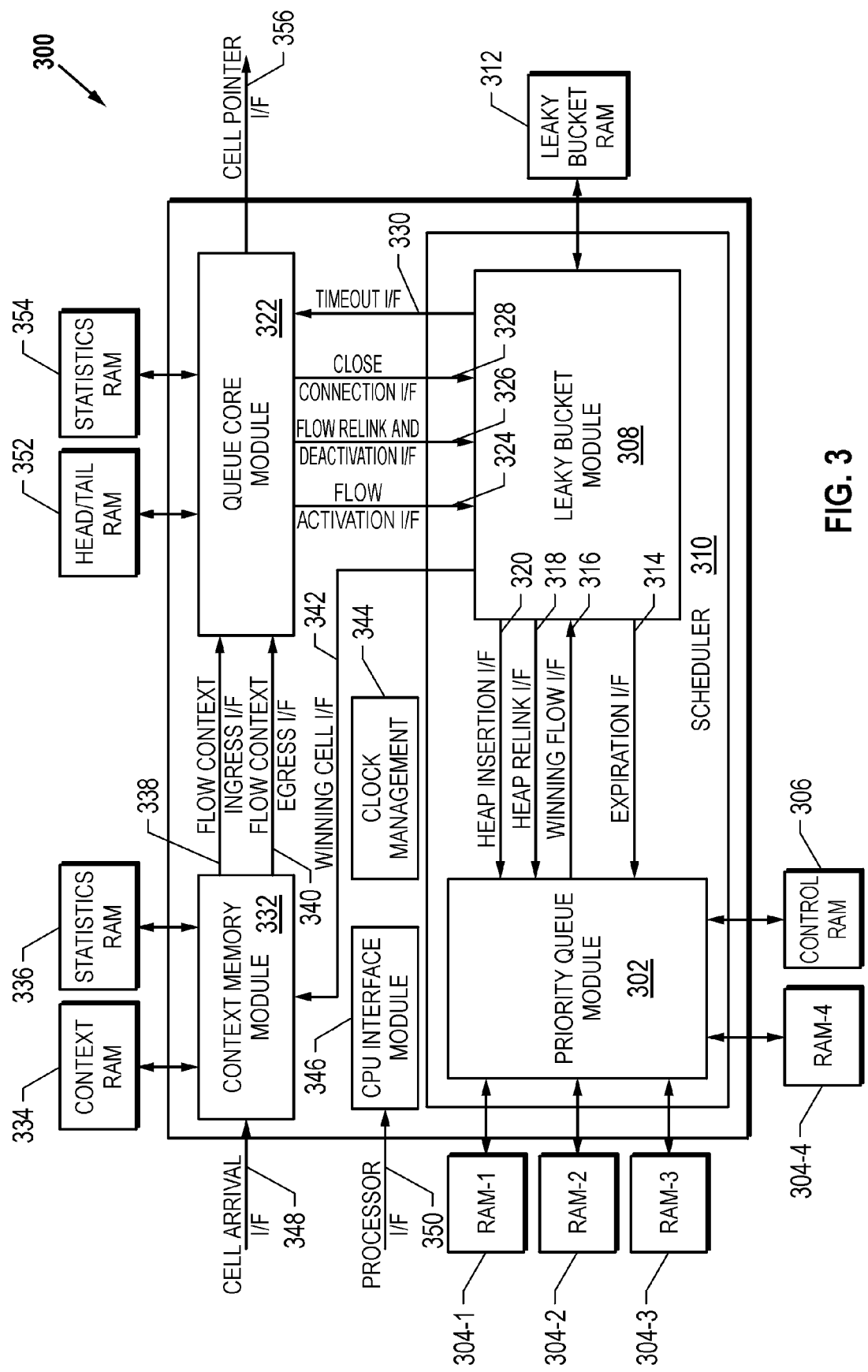
FIG. 3 depicts a high level functional block diagram illustrating a Leaky Bucket Module and a Priority Queue Module of the scheduler for implementing the teachings of the present invention.

Referring now to FIG. 3, depicted therein is a high level functional block diagram illustrating a switch fabric card 300 that includes a scheduler block 310 for implementing a CH-based sorting scheme in accordance with the teachings of the present invention. The scheduler block 310 is comprised of a PQM 302 and an LBM 308 having a number of interfaces therebetween to effectuate message/data communication relating to scheduler operations. These interfaces comprise a time expiration interface 314, a winning flow interface 316, a heap/flow relink interface 318, and a heap/flow insertion interface 320. The PQM block 302 is further interfaced with a plurality of memory blocks 304-1 through 304-4 for storing the various PQ data structures relating to the hierarchical scheduler architecture described above. A control memory 306 coupled to the PQM block 302 is operable to store control program code relating to the PQM's operations.

The LBM block 308 is also interfaced with one or several memory blocks, e.g., memory 312, operable to store information relating to the policing and shaping algorithmic processes effectuated by the LBM. In one implementation, the LBM is operable to effectuate a Leaky Bucket Calculator as a state machine that determines the eligibility of a cell according to the traffic contract and the history of the connection it belongs to. When used for policing, the state machine determines the compliance of the incoming cells, whereas when used in shaping, it determines the time when the cell is eligible for service. Depending on the service Class, one or more specific algorithmic processes with particular parametrics (i.e., traffic descriptors, Leaky Bucket parameters (Theoretical Arrival Time or TAT, TS values, cell arrival times, etc.) are provided in order to effectuate the LBM's policing and shaping operations. As will be described in detail below, the GFR service of the present invention is implemented using two separate algorithmic LB processes, each with a separate set of parametrics, that are operable to regulate a guaranteed flow portion and a non-guaranteed flow portion, respectively.

The LBM block 308 is also interfaced to a Context Memory Module (CMM) 332 and a Queue Core Module (QCM) 322 in order to achieve its overall functionality of maintaining the Leaky Bucket information for all the flows serviced by the ATM fabric. A cell arrival interface 348 associated with the CMM block 332 operates as the entry point for incoming cells. A context memory 334 associated with the CMM block 332 is operable to store flow-based information such as QoS, FID, Leaky Bucket parameters, Destination Path Tag (DPT) information, etc. Also, a statistics memory block 336 may be provided for collecting performance monitoring data relative to the connections served by the ATM switch fabric card 300. Ingress flow context information and egress flow context information is provided to the QCM block 322 via interfaces 338 and 340, respectively. A head/tail pointer memory 352 and a statistics memory 354 are coupled to the QCM block 322. A cell pointer interface 356 associated therewith is used for pointing to cells eligible for service based on scheduling operations.

Interfacing between the QCM block 322 and LBM block 308 includes the following: a Flow Activation interface 324, a Flow Relink and Deactivation interface 326, a Close Connection interface 328 and a Timeout interface 330. A winning cell interface 342 provided between the LBM block 308 and CMM block 332 is operable to transmit information regarding the winner cells. Further, a clock management block 344 and a processor interface module 346 having a processor interface 350 are also provided.

In view of the various structural blocks described above, the overall functionality of the LBM block 308 includes the following:

Flow Activation: When a cell arrives and the cell buffer relative to its FID was previously empty, a Flow Activation message is sent by the QCM to the LBM. This interface contains the information found in the context memory relative to the flow.

Winning Flow and Flow Relink/Deactivation: When a flow is chosen as the winner by the PQM, it is deleted from the different heaps it belongs (depending on the aggregation layers, for instance). If there are cells remaining in the cell buffer of that specific flow, then the LBM recalculates the TS values and relinks the flow in the PQ data structures. If there is no cell remaining, the LBM calculates the TS values for that flow and stores them in the Leaky Bucket memory until another cell arrives for that flow.

Close Connection: If the CAC suppresses a flow, the cell buffer is flushed and the FID may be reused for another connection. In order to prevent use of the old parameters for the new connection, the LBM has to be informed that this flow is no longer valid.

Time Expiration/Timeout: The Leaky Bucket memory is checked, preferably periodically, in order to prevent the storage of expired times.

Figure 4:
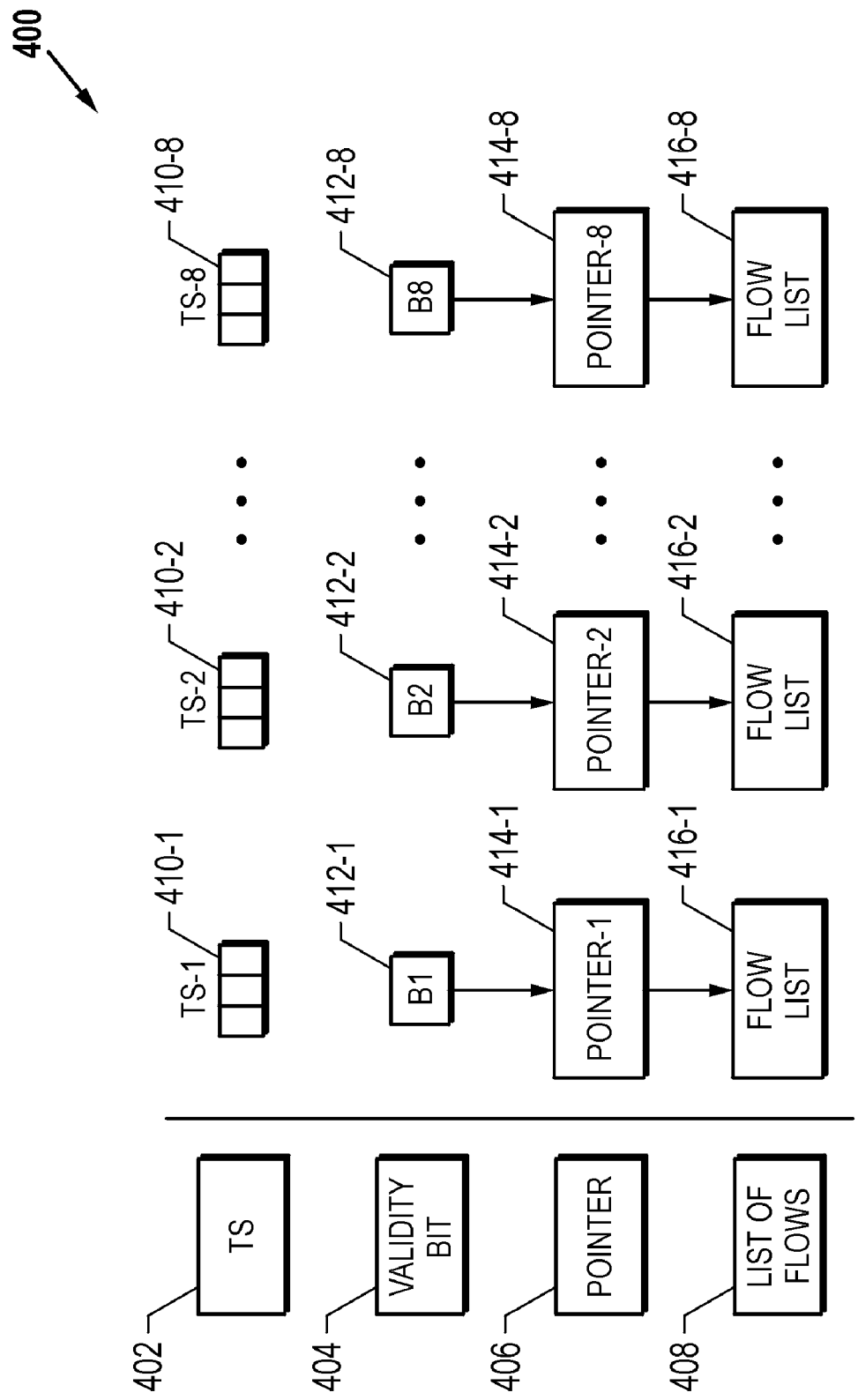
FIG. 4 (Prior Art) depicts an exemplary conventional calendar queue (CQ) scheme for sorting eight timestamp values.

Based on the foregoing, it should be appreciated that efficient scheduler implementations require schemes that are capable of processing through a large number of TS values (e.g., where a bit field of K bits is utilized, $2^K$ TS values are possible) in order to perform operations such as insertion, deletion, sorting, et cetera, with respect to the TS data structures. In particular, efficient sorting schemes are necessary to determine minimum TS values used in the GCRA methods set forth above. As alluded to in the Background section of the present patent application, whereas heaps and calendar queues (CQ) are some of the better-known structures used for sorting large datasets, they are beset by algorithmic complexity (heaps) and/or excessive memory usage (CQ structures). FIG. 4 depicts an exemplary conventional CQ scheme 400 for sorting eight TS values resulting from using a 3-bit TS field. Reference numerals 410-1 through 410-8 refer to the eight TS values, TS-1 to TS-8, that a TS 402 can take. A validity bit 404 and a pointer 406 may be associated with the TS field 402, which validity bit is operable to indicate whether the associated TS value and/or its pointer is valid. The pointer is operable to point to a list of flows 408 that have the TS value based on their LB calculations. For instance, reference numerals 412-1 through 412-8 refer to the eight bits associated with TS-1 to TS-8, respectively. Pointers 414-1 through 414-8 point to the corresponding linked flow lists 416-1 through 416-8. While sorting can be performed quite rapidly in the conventional CQ scheme, it is less efficient in terms of memory utilization because memory for all eight TS values needs to be allocated beforehand. As to the number of operations needed for sorting through TS-1 to TS-8, the worst case search time involves the time to check the eight validity bits.

Figure 5:
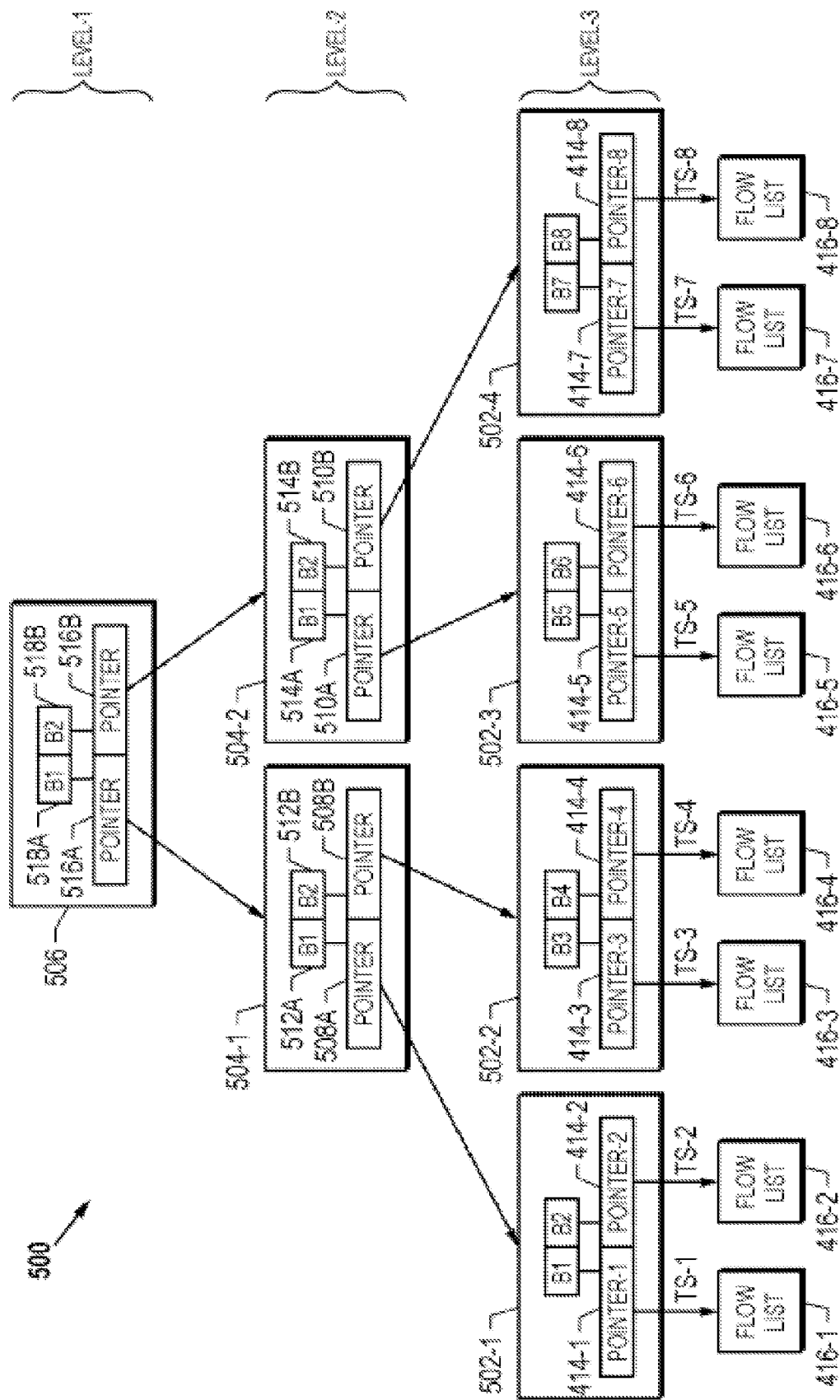
FIG. 5 depicts an exemplary calendar heap (CH) scheme for sorting eight timestamp values in accordance with the teachings of the present invention.

Referring now to FIG. 5, depicted therein is an exemplary hybrid "calendar heap" (CH) scheme 500 of the present invention for sorting eight TS values. In accordance with the teachings of the present invention, a radix value of 2 is chosen to group the eight TS values into four groups 502-1 through 502-4, each having two validity bits and respective pointers associated therewith. These four groups, each being a 2-bit heap structure, form the bottom layer, Level-3, of a hierarchical tree, wherein Level-2 layer comprises two 2-bit heap structures 504-1 and 504-2 and Level-1 layer (i.e., top node) comprises a single 2-bit structure 506. Each of the 2-bit heap structures includes a bit field having a number of bits equal to the radix value, i.e., 2 in this example, and a corresponding number of pointers which point to the 2-bit heaps of the subsequent layer. Bits 518A and 518B form the top layer's heap structure 506 which includes pointers 516A and 516B that point to the Level-2 heap structures 504-1 and 504-2, respectively. In turn, the 2-bit heap 504-1 includes bits 512A, 512B and corresponding pointers 508A, 508B; and the 2-bit heap 504-2 includes bits 514A, 514B and corresponding pointers 510A, 510B. Each of these four Level-2 pointers points to a corresponding one of the Level-3 groupings 502-1 to 502-4 described above.

Sorting begins from the Level-1 heap, wherein the determination as to which of the pointers is valid and points to the tree segment containing the minimum TS value is based on the contents of the bits 518A and 518B. If the minimum TS value happens to be in the first half of the tree (i.e., among TS-1 through TS-4), pointer 516A is valid and B1 518A will be set. Thereafter, the heap structure 504-1 referred to by pointer 516A will be used for making the determination as to which of the pointers 508A and 508B is valid, ultimately leading to the Level-3 node that points to the flow list having the minimum TS value.

Since the hierarchical tree structure is populated only when the valid TS values are obtained, there is no need for pre-allocating memory that is capable of storing all possible TS values. Accordingly, memory utilization becomes more efficient in the CH sorting scheme. Further, the search time involves checking only six bits (2 bits for each Level). It should be appreciated that the search time is ultimately related to the number of Levels and the radix value. Where N=total number of TS values (i.e., $\log_2[N]$=number of bits in the TS field) and R=radix, the number of Levels equals $\log_R[N]$, each Level including $R^{[Level-1]}$ number of R-bit heap structures. As the radix value increases, the sorting speed also increases because the number of layers in the hierarchical tree structure will be smaller. However, the memory requirements for the resultant tree structure will increase. As a consequence, it is a matter of practice to balance memory economy with the search times by choosing appropriate R values in a particular application.

Figure 6A:
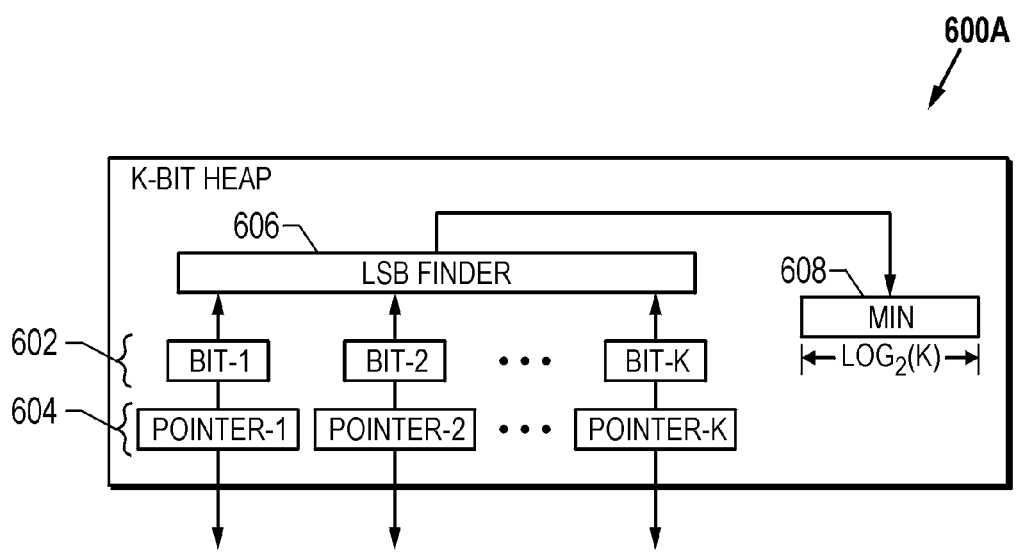
FIG. 6A depicts an exemplary K-bit heap structure that can be employed in a CH scheme of the present invention.

Those skilled in the art should recognize that per-heap determinations necessary to identify which next-level tree segment should be followed for searching can be accomplished by various means. In one embodiment of the present invention, a Least Significant Bit (LSB) finder is provided for each heap structure, which is operable on the heap's bit field (having a number of bits equal to the radix value selected) in conjunction with a MIN block having $\log_2$[radix] number of bits. FIG. 6A depicts an exemplary K-bit heap 600A provided in accordance with the teachings of the present invention that can be employed in a CH scheme. Reference numeral 602 refers to the K bits associated with K pointers 604 that point to the next level's K-bit heaps, which can be equal to $K^{[Level-1]}$ in total. As alluded to before, the total number of levels can be $\log_K[N]$ for N timestamps and K radix. For instance, if N=8 (i.e., 3-bit TS values) and radix=2, the number of levels=3 and, accordingly, there will be two 2-bit heaps for the Level-2 layer. Reference numeral 606 refers to the LSB finder associated with the K-bit heap, which operates in conjunction with the MIN block 608 having $\log_2[K]$ bits.

Figure 6B:
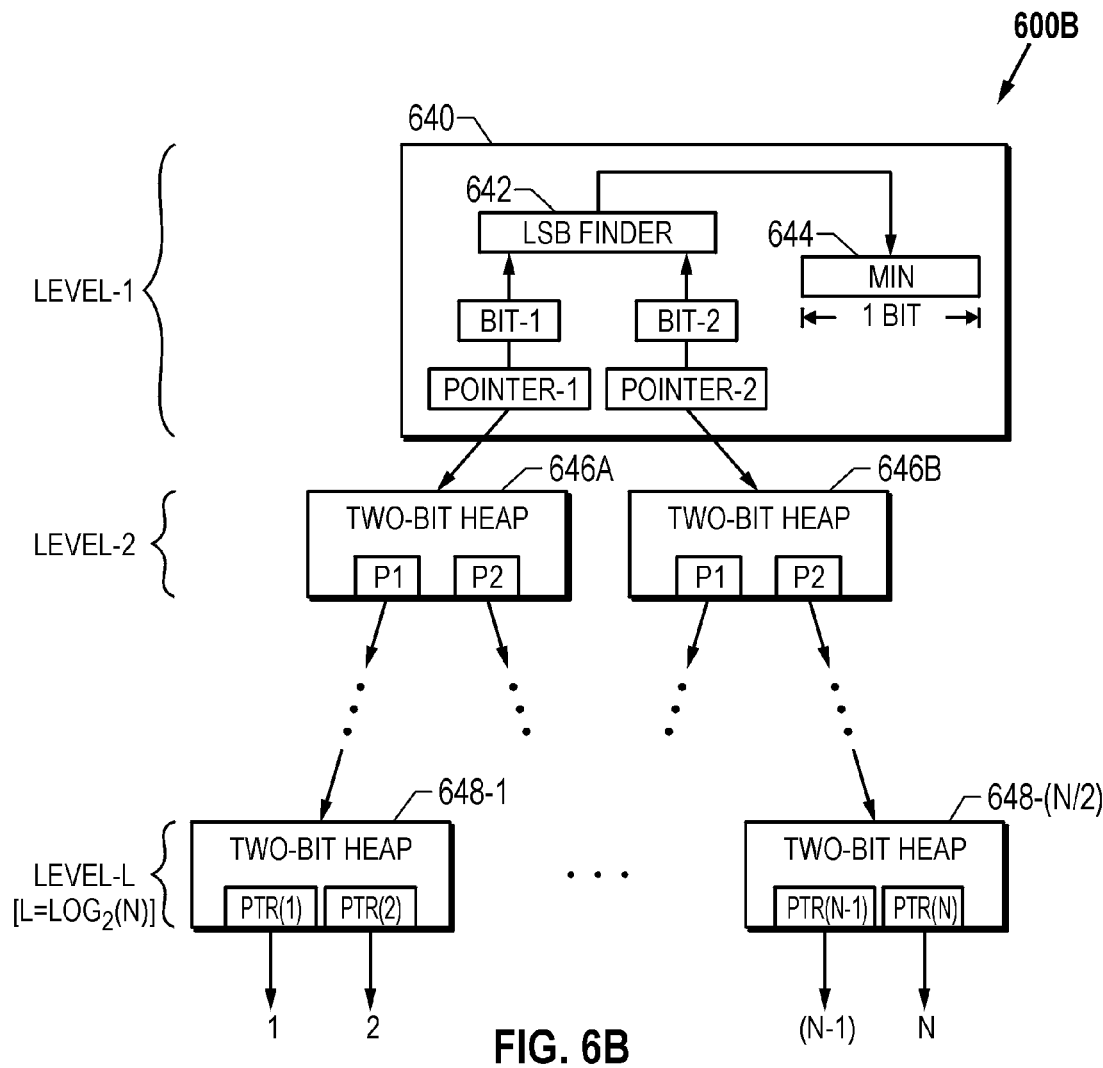
FIG. 6B depicts an exemplary 2-bit CH scheme that utilizes a radix of 2 for grouping TS values into 2-bit heaps.
Figure 6C:
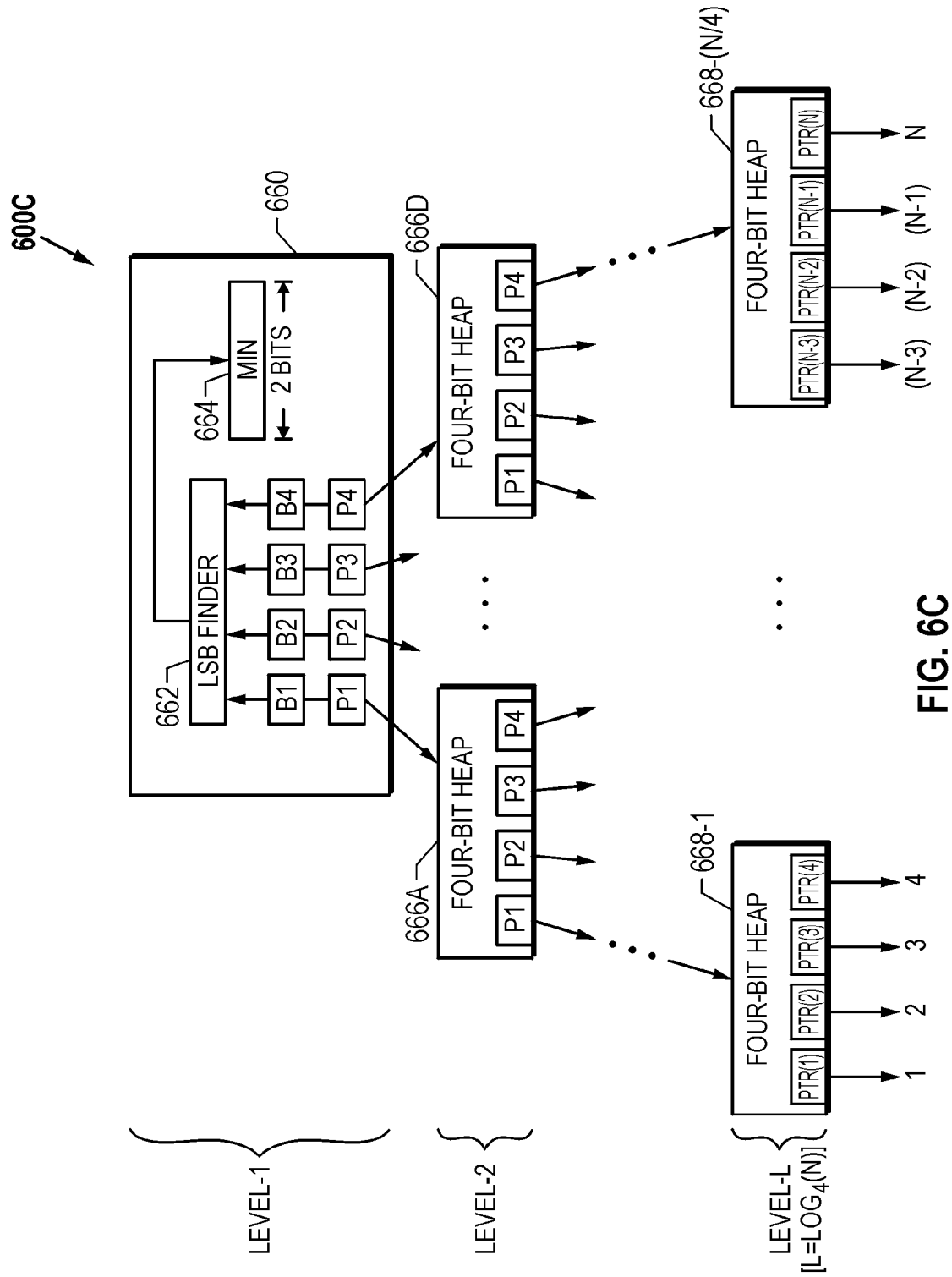
FIG. 6C depicts an exemplary 4-bit CH scheme that utilizes a radix of 4 for grouping TS values into 4-bit heaps.

FIGS. 6B and 6C depict exemplary 2-bit and 4-bit CH schemes 600B, 600C for sorting/searching N timestamps using a 2-bit radix and a 4-bit radix, respectively. As shown in the CH scheme 600B, the top layer, Level-1, has a single 2-bit heap structure 640 having Bit-1 and Bit-2 that correspond to Pointer-1 and Pointer-2, respectively. LSB Finder 642 is operable with a 1-bit MIN block 644. Two heaps 646A and 646B are provided for the next layer, Level-2, each with a pair of pointers that point to the next level in the hierarchy. Ultimately, the bottom layer, Level-L (where L=$\log_2[N]$), includes N/2 2-bit heaps 648-1 to 648-(N/2), each having two pointers that point to the linked list of flows at two TS values corresponding thereto.

Likewise, the 4-bit CH scheme 600C includes a hierarchical tree having L layers, where L=$\log_4[N]$, for sorting N timestamps using 4-bit heaps. A single 4-bit heap structure 660 forms the top layer, i.e., Level-1, that includes an LSB Finder 662 in conjunction with a 2-bit MIN block 664 that is operable with four bits, B1-B4, of the heap. Each of the four bits is associated with a pointer that points to a heap of the next layer. Four such 4-bit heaps 666A-D form the next layer, i.e., Level-2 layer. Ultimately, the bottom layer, Level-L layer, includes N/4 groups 668-1 to 668-(N/4), each group having 4 bits and associated pointers.

Based on the foregoing discussion, it should be appreciated that the present invention provides an innovative scheme for implementing a hybrid data structure that involves both queue-like performance characteristics as well as heap-like storage efficiency. The conventional CQ, which is one-dimensional, is arranged as a multi-dimensional tree by partitioning the TS field into several portions based on the selected radix that is optimal for a particular application. Radix-32 and radix-64 are particularly deemed to be good candidates for advantageous implementation. Also, multiple radix values may be implemented across different service planes and data aggregation layers of a hierarchical ATM scheduler arrangement. One skilled in the art will readily recognize, however, that although the hybrid CH scheme of the present invention has been set forth in the context of a hierarchical scheduler operable with an access node's ATM fabric, the teachings contained herein are not limited to such context only; rather they can be practiced in other data structure optimization applications also.

It is believed that the operation and construction of the present invention will be apparent from the foregoing Detailed Description. While the embodiments of the invention shown and described have been characterized as being exemplary, it should be readily understood that various changes and modifications could be made therein without departing from the scope of the present invention as set forth in the following claims.

What is claimed is:

1. A method for sorting N timestamp (TS) values in an Asynchronous Transfer Mode (ATM) fabric scheduler implemented in an access network element, comprising the steps:

selecting a radix (R) value for grouping said TS values into N/R groups, wherein each group is associated with a set of bits corresponding in number to said radix value, said bits for indicating which of said group's TS values are valid;

creating a plurality of layers in a hierarchical tree arrangement wherein said set of bits forms a layer of $\log_R(N)$ level and each layer includes a group of heap structures equal in number to $R^{[Level-1]}$, Level=1,2, ..., $\log_R(N)$, and further wherein each heap structure includes R number of bits and R number of pointers, said pointers of a Level(i) layer pointing to heap structures of Level(i+1) layer, where i=1,2, ..., $\{\log_R(N)-1\}$; and starting from a Level-1 heap structure, successively determining via a Least Significant Bit (LSB) finder operating on said R number of bits for a particular heap structure on Level(i) layer which heap structure on a particular subsequent Level has a minimum value until said $\log_R(N)$ Level is reached.

2. The method for sorting N timestamp (TS) values in an ATM fabric scheduler as set forth in claim 1, wherein said radix value is equal to 2.

3. The method for sorting N timestamp (TS) values in an ATM fabric scheduler as set forth in claim 1, wherein said radix value is equal to 4.

4. The method for sorting N timestamp (TS) values in an ATM fabric scheduler as set forth in claim 1, wherein said operation of successively determining which heap structure on a particular subsequent Level has a minimum value further comprises:

traversing to another heap structure of Level(i+1) layer using a pointer associated with a particular bit identified by said LSB finder.

5. The method for sorting N timestamp (TS) values in an ATM fabric scheduler as set forth in claim 1, wherein said operation of selecting a radix (R) value for grouping said TS values into N/R groups includes picking a variable radix value.

6. The method for sorting N timestamp (TS) values in an ATM fabric scheduler as set forth in claim 1, wherein each of said bits at said $\log_R(N)$ level is associated with a pointer operable to point to a linked list of ATM flows that are to be scheduled for service based on a particular TS corresponding thereto.

7. A computer-accessible medium operable with a processor interface disposed in an Asynchronous Transfer Mode (ATM) fabric scheduler of an access network element, said medium having instructions thereon for performing the following operations when executed on a processor associated therewith, comprising:

instructions operable to select a radix (R) value for grouping N timestamp (TS) values into N/R groups, wherein each group is associated with a set of bits corresponding in number to said radix value, said bits for indicating which of said group's TS values are valid;

instructions for creating a plurality of layers in a hierarchical tree arrangement wherein said set of bits forms a layer of $\log_R(N)$ level and each layer includes a group of heap structures equal in number to $R^{[Level-1]}$, Level=1,2, ..., $\log_R(N)$, and further wherein each heap structure includes R number of bits and R number of pointers, said pointers of a Level(i) layer pointing to heap structures of Level(i+1) layer, where i=1,2, ..., $\{\log_R(N)-1\}$; and instructions for using a Least Significant Bit (LSB) finder operable on said R number of bits for a particular heap structure on Level(i) layer for successively determining, starting from a Level-1 heap structure, which heap structure on a particular subsequent Level has a minimum value until said $\log_R(N)$ Level is reached.

8. The computer-accessible medium as set forth in claim 7, wherein said instructions operable to select a radix (R) include instructions to select a radix value of 2.

9. The computer-accessible medium as set forth in claim 7, wherein said instructions operable to select a radix (R) include instructions to select a radix value of 4.

10. The computer-accessible medium as set forth in claim 7, wherein said instructions for successively determining which heap structure on a particular subsequent Level has a minimum value further comprise:

instructions for traversing to another heap structure of Level(i+1) layer using a pointer associated with a particular bit identified by said LSB finder.

11. The computer-accessible medium as set forth in claim 7, wherein said instructions operable to select a radix (R) include instructions to pick a variable radix value.

12. The computer-accessible medium as set forth in claim 7, wherein each of said bits at said $\log_R(N)$ level is associated with a pointer operable to point to a linked list of ATM flows that are to be scheduled for service based on a particular TS corresponding thereto.

13. A system for sorting N timestamp (TS) values in an Asynchronous Transfer Mode (ATM) fabric scheduler implemented in an access network element, comprising:

means for grouping said TS values into N/R groups using a radix value of R, wherein each group is associated with a set of bits corresponding in number to said radix value, said bits for indicating which of said group's TS values are valid;

means for creating a plurality of layers in a hierarchical tree arrangement wherein said set of bits forms a layer of $\log_R(N)$ level and each layer includes a group of heap structures equal in number to $R^{[Level-1]}$, Level=1, 2, ..., $\log_R(N)$, and further wherein each heap structure includes R number of bits and R number of pointers, said pointers of a Level(i) layer pointing to heap structures of Level(i+1) layer, where i=1,2, ..., $\{\log_R(N)-1\}$; and means for a Least Significant Bit (LSB) finder operating on said R number of bits for a particular heap structure on Level(i) layer for successively determining, starting from a Level-1 heap structure, which heap structure on a particular subsequent Level has a minimum value until said $\log_R(N)$ Level is reached.

14. The system for sorting N timestamp (TS) values in an ATM fabric scheduler as set forth in claim 13, wherein said radix value is equal to 2.

15. The system for sorting N timestamp (TS) values in an ATM fabric scheduler as set forth in claim 13, wherein said radix value is equal to 4.

16. The system for sorting N timestamp (TS) values in an ATM fabric scheduler as set forth in claim 13, wherein said means for grouping said TS values into N/R groups includes means for picking a variable radix value.

17. The system for sorting N timestamp (TS) values in an ATM fabric scheduler as set forth in claim 13, wherein each of said bits at said $\log_R(N)$ level is associated with a pointer operable to point to a linked list of ATM flows that are to be scheduled for service based on a particular TS corresponding thereto.

* * * * *